(12) United States Patent
Park et al.

(10) Patent No.: US 9,939,173 B2
(45) Date of Patent: Apr. 10, 2018

(54) SYSTEM FOR CONTROLLING EXHAUST HEAT RECOVERY TEMPERATURE USING MIXING VALVE AND METHOD THEREFOR

(71) Applicant: KYUNGDONG NAVIEN CO., LTD, Pyeongtaek-si, Gyeonggi-do (KR)

(72) Inventors: Woo Sung Park, Osan-si (KR); Dae Woong Park, Incheon (KR)

(73) Assignee: KYUNGDONG NAVIEN CO., LTD, Gyeonggi-do (KR)

( * ) Notice: Subject to any disclaimer, the term of this patent is extended or adjusted under 35 U.S.C. 154(b) by 53 days.

(21) Appl. No.: 14/899,448

(22) PCT Filed: Jul. 17, 2014

(86) PCT No.: PCT/KR2014/006474
§ 371 (c)(1),
(2) Date: Dec. 17, 2015

(87) PCT Pub. No.: WO2015/026063
PCT Pub. Date: Feb. 26, 2015

(65) Prior Publication Data
US 2016/0138829 A1    May 19, 2016

(30) Foreign Application Priority Data
Aug. 23, 2013 (KR) ........................ 10-2013-0100709

(51) Int. Cl.
*F24H 1/52* (2006.01)
*F24D 11/02* (2006.01)
(Continued)

(52) U.S. Cl.
CPC ....... *F24H 9/2007* (2013.01); *F24D 19/1066* (2013.01); *F24H 1/18* (2013.01);
(Continued)

(58) Field of Classification Search
CPC .... F22B 1/1846; F22B 1/1876; F22B 1/1815; F22B 5/00; F24D 17/001; F24D 11/02;
(Continued)

(56) References Cited

U.S. PATENT DOCUMENTS 7,347,057 B1 * 3/2008 Garrabrant ............ F25B 49/043
62/148
8,978,744 B2 * 3/2015 Chikami ................. F24D 3/082
165/146
(Continued)

FOREIGN PATENT DOCUMENTS

JP     1983-137921 U    9/1983
JP     08-296874 A    11/1996
(Continued)

*Primary Examiner* — Gregory A Wilson
(74) *Attorney, Agent, or Firm* — Novick, Kim & Lee, PLLC; Jae Youn Kim

(57) ABSTRACT

There is provided a system including: an automatic supplement valve configured to automatically supplementing direct water; an expansion tank configured to be connected to the automatic supplement valve to adjust expansion pressure depending on the temperature change of the direct water; an exhaust heat pump configured to be connected to the expansion tank to circulate heat in an exhaust heat line connecting the exhaust heat source and the hot water tank; and a mixing valve configured to be extendedly formed between a first hot water line for receiving the exhaust heat of the exhaust heat source and a second hot water line having passed through the exhaust heat exchanger of the hot water tank to mix the first hot water with the second hot water.

4 Claims, 2 Drawing Sheets

(51) Int. Cl.
*F24H 9/20* (2006.01)
*F24D 19/10* (2006.01)
*F24H 1/18* (2006.01)
*F24D 11/00* (2006.01)

(52) U.S. Cl.
CPC ............ *F24H 1/188* (2013.01); *F24D 11/005* (2013.01); *F24D 2200/19* (2013.01); *F24D 2200/26* (2013.01); *F24D 2220/042* (2013.01); *Y02B 30/52* (2013.01)

(58) Field of Classification Search
CPC ......... F24H 1/52; B60H 1/04; B60H 1/00899; B60H 2001/0015
See application file for complete search history.

(56) References Cited

U.S. PATENT DOCUMENTS

| | | | | |
|---|---|---|---|---|
| 8,985,063 | B2* | 3/2015 | Adachi | F24H 1/523 122/14.1 |
| 9,217,574 | B2* | 12/2015 | Kim | F24D 11/0214 |
| 9,353,976 | B2* | 5/2016 | Mihara | F25B 9/008 |
| 9,644,876 | B2* | 5/2017 | Tamaki | F25B 13/00 |
| 2006/0283404 | A1* | 12/2006 | Wen-Lung | F01K 13/00 122/20 R |
| 2008/0098968 | A1* | 5/2008 | Liu | F24D 17/02 122/7 R |
| 2010/0025488 | A1* | 2/2010 | Park | F24D 3/08 237/2 B |
| 2016/0312997 | A1* | 10/2016 | Shenoy | F22B 1/1815 |
| 2017/0101900 | A1* | 4/2017 | Goto | F01K 7/44 |

FOREIGN PATENT DOCUMENTS

| | | |
|---|---|---|
| JP | 2002-267264 A | 9/2002 |
| JP | 2003-042546 A | 2/2003 |
| JP | 2006-207914 A | 8/2006 |
| KR | 10-0734562 B1 | 7/2007 |
| KR | 10-1046540 B1 | 7/2011 |
| WO | 2008016216 A1 | 2/2008 |

* cited by examiner

SYSTEM FOR CONTROLLING EXHAUST HEAT RECOVERY TEMPERATURE USING MIXING VALVE AND METHOD THEREFOR

TECHNICAL FIELD

The present invention relates to a system for controlling exhaust heat recovery temperature using a mixing valve and a method therefor, and more particularly, to a system for controlling exhaust heat recovery temperature using a mixing valve and a method therefor, which may reduce time required for raising the temperature to a normal temperature of a generating part during an initial operation and which may provide a stable operation depending on a temperature change of direct water during a use of hot water.

BACKGROUND ART

Generally, an exhaust heat recovery system is a system which may supply heating or hot water by recycling exhaust heat which is generally discharged and discarded from exhaust heat sources, such as exhaust heat from a polymer electrolyte membrane fuel cell (PEMFC), exhaust heat from an internal combustion engine (ICE), surplus heat, waste incinerating heat, drainage heat, and heat generation of a substation.

For example, the polymer electrolyte membrane fuel cell (PEMFC) which is an environmentally-friendly power generation system which directly converts chemical energy generated from oxidation into electric energy generates a large amount of exhaust heat used as cooling water during an operation of the system. However, the PEMFC generally discharges the exhaust heat to the outside through an exhaust port almost without using the exhaust heat and therefore has not actively used heat discharged as the exhaust heat from the system.

Therefore, an exhaust heat recovery system capable of easily recovering and recycling exhaust heat generated from a fuel cell system while using the existing boiler apparatus already installed in the home, etc., as it is has been developed.

As illustrated in FIG. 1, the existing exhaust heat recovery system 10 primarily heats water stored in a hot water tank 11 using an exhaust heat exchanger 11-1 of an exhaust heat source 1 and secondarily heats the primarily heated water using a boiler 12 if necessary to supply heating and hot water to a user, and as a result, may obtain an effect of more saving energy than a boiler directly using direct water having a relatively lower temperature.

In detail, the existing exhaust heat recovery system 10 uses the hot water of the hot water tank 11 as it is if the temperature of the hot water tank 11 is higher than a hot water setting temperature of the boiler 12 and additionally operates the boiler 12 to satisfy the hot water setting temperature if the temperature of the hot water tank 11 is low, when the user uses the hot water.

Further, a heat exchanger 15-1 is disposed between the generating part circuit including the exhaust heat source 1, an exhaust heat pump 15-5, etc., and the exhaust heat recovery system 10 circuit including the hot water tank 11, an expansion tank 15-2, an exhaust heat pump 15-4, an automatic supplement valve 15-3, etc., to exchange heat heated by the generating part circuit with the exhaust heat recovery system 10 and allow pumps of each circuit to control the exhaust heat recovery temperature.

However, the circuit for allowing the heat heated by the power with the exhaust heat recovery system 10 in the middle is complicated, and as a result there is a problem of control difficulty and an increase in manufacturing costs.

DISCLOSURE

Technical Problem

An object of the present invention is to provide a system for controlling exhaust heat recovery temperature using a mixing valve and a method therefor, which may control an opening of a mixing valve depending on a temperature of a hot water tank of the exhaust heat recovery system and appropriately control the opening of the mixing valve depending on a change in temperature in response to an introduction of direct water due to hot water to make an operation condition normal.

Technical Solution

According to an exemplary embodiment of the present invention, there is provided a system for controlling exhaust heat recovery temperature including a hot water tank including an exhaust heat exchanger for recovering exhaust heat from an exhaust heat source and a heating heat exchanger for exchanging heat for heating using hot water, and an auxiliary boiler configured to heat the hot water heat exchanged from the exhaust heat exchanger and the heating heat exchanger to satisfy temperature set by a user and supplying the hot water to a heating space and a hot water supply space, the system for controlling exhaust heat recovery temperature including; an automatic supplement valve automatically supplementing direct water; an expansion tank connected to the automatic supplement valve to adjust expansion pressure depending on the temperature change of the direct water; an exhaust heat pump connected to the expansion tank for internal circulation in an exhaust heat line connecting the exhaust heat source and the hot water tank; and a mixing valve extending between a first hot water (1H) line for receiving the exhaust heat of the exhaust heat source and a second hot water (2H) line positioned after passing again through the exhaust heat exchanger of the hot water tank, to mix the first hot water (1H) with the second hot water (2H), in which the opening of the mixing valve may be adjusted depending on the temperature of the exhaust heat exchanger or depending on the exhaust heat supply temperature and the exhaust heat recovery temperature changed in response to an introduction of direct water due to the hot water supply.

The system may further include: an exhaust heat supply temperature sensor T1 measuring the temperature of the first hot water (1H) to measure the exhaust heat supply temperature, and an exhaust heat recovery temperature sensor T2 measuring the second hot water (2H) temperature to measure the exhaust heat recovery temperature, in which upon introduction of direct water, the exhaust heat supply temperature and the exhaust heat recovery temperature which are lowered are re-measured and the opening of the mixing valve is adjusted according to a temperature difference thereto.

According to another exemplary embodiment of the present invention, there is provided a method for controlling exhaust heat recovery temperature including a hot water tank including the steps of: measuring an exhaust heat supply temperature and an exhaust heat recovery temperature; adjusting an opening of a mixing valve depending on the measured temperature; introducing direct water due to hot water supply; and adjusting again the opening of the mixing valve to correspond to a change in temperature in response to the direct water.

The step of measuring the exhaust heat supply temperature and the exhaust heat recovery temperature may further include calculating average information of temperatures measured by a temperature sensor of the hot water tank.

Advantageous Effects

According to the exemplary embodiments of the present invention, it is possible to reduce the initial operation time by applying the mixing valve and reduce the impact of the generating part due to the rapid cooling of the exhaust heat recovery temperature by reducing the temperature of direct water upon the use of hot water.

According to the exemplary embodiments of the present invention, it is possible to more improve the efficiency and the durability of the gas engine and the fuel cell, compared to the existing heat exchanger.

BEST MODE

Figure 1:
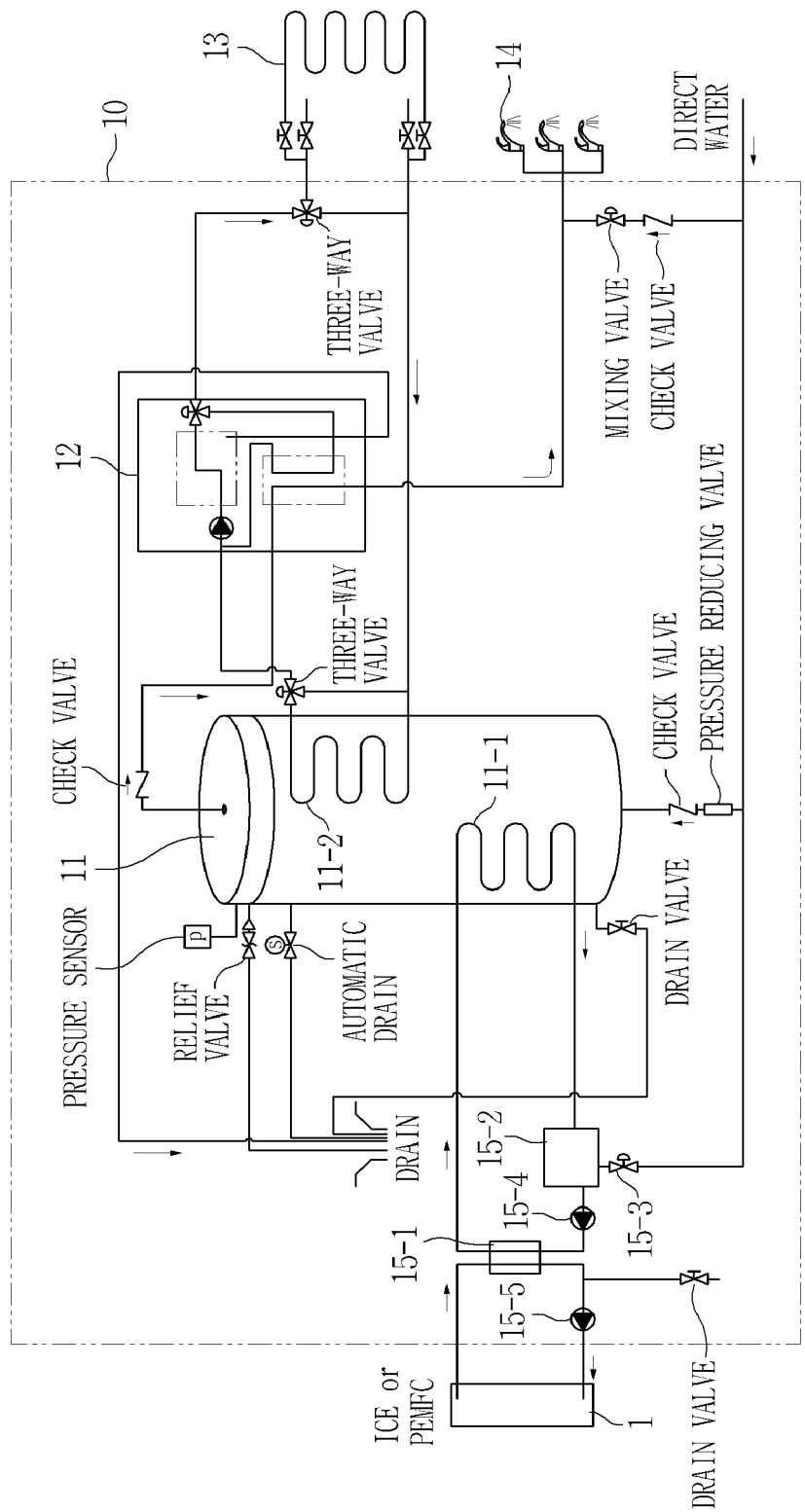
FIG. 1 is a diagram illustrating the overall configuration of a system for controlling exhaust heat recovery temperature according to a related art.

Exemplary embodiments of the present invention will be described with reference to the accompanying drawings in order to sufficiently understand the present invention. The embodiments of the present invention may be modified in many different forms and the scope of the invention should not be limited to the embodiments set forth herein. Rather, these embodiments are provided so that this disclosure will be thorough and complete, and will fully convey the concept of the invention to those skilled in the art. It is to be noted that the same reference numerals will be used to designate the same components in each drawing. In the drawings, the shapes and dimensions may be exaggerated for clarity, and the same reference numerals will be used throughout to designate the same or like components.

Figure 2:
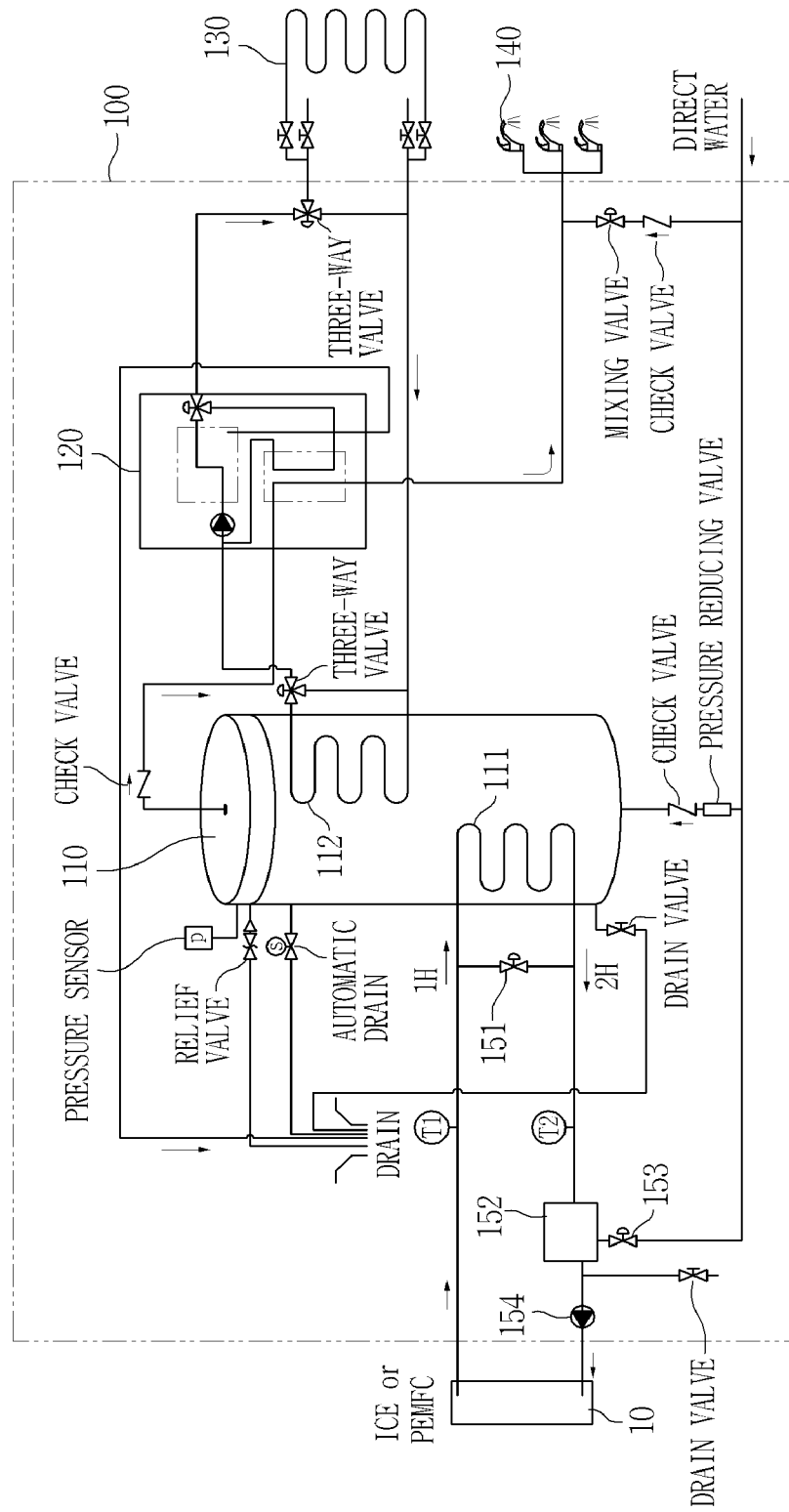
FIG. 2 is a diagram illustrating the overall configuration of a system for controlling exhaust heat recovery temperature using a mixing valve according to the present invention.

First, as illustrated in FIG. 2, an exhaust heat recovery system 100 according to an exemplary embodiment of the present invention includes: a hot water tank 110 including a exhaust heat exchanger 111 configured to recover exhaust heat from an exhaust heat source 10 to store hot water and a heating heat exchanger 112 configured to use the hot water to exchange heat for heating; and a boiler 120 configured to heat the hot water heat-exchanged from the exhaust heat exchanger 111 and the heating heat exchanger 112 to satisfy temperature set by a user and supply the heated hot water to a heating space 130 and a hot water supply space 140.

In this case, the exhaust heat recovery system is formed to have a circulation structure in which the direct water for cooling the exhaust heat source 10 is heated with the exhaust heat generated the exhaust heat source 10 and the direct water heated by the exhaust heat source 10 is introduced into the exhaust heat exchanger 111, and the direct water stored inside the hot water tank 110 is heated by the exhaust heat exchanger 111 to generate hot water and then allow the hot water to again return to the exhaust heat source 10 by the pump (not illustrated).

The "direct water" used in the present specification means generally used tap water or ground water and the "hot water" means the direct water heated by the exhaust heat exchanger 111.

A lower portion of the hot water tank 110 is attached with a pressure reducing valve to control an internal pressure of the hot water tank 110 to be constant and an upper portion, a middle portion, and the lower portion of the hot-water tank 110 is provided with sensors (not illustrated) for sensing a pressure of the hot-water tank 110 to control the introduction of direct water into the hot-water tank 110 through the pressure reducing valve.

The hot water tank 110 store the hot water by sufficiently insulating heat using the exhaust heat exchanger 111, and as a result the hot water supply space 140 and the heating space 130 may use hot water.

When the hot water stored in the hot water tank 110 is a high temperature exceeding a basic setting temperature for cooling the exhaust heat source 10, the hot water of the hot water tank 110 may be discharged to efficiently cool the exhaust heat source 10 and new direct water may be introduced to continuously cool the exhaust heat source 10 by the heat exchange of the exhaust heat exchanger 111.

The heating heat exchanger 112 is installed in the hot water tank 110 to recover the exhaust heat of the exhaust heat source 10 and recycle the recovered exhaust heat for heating. In this case, a working fluid which is useful for heat exchange is circulated in the heating heat exchanger 112, introduced into the boiler 120, heated to the setting temperature required for heating in the boiler 120, and then supplied to the heating space 130 to heat the heating space 130. Next, the heating heat exchanger 112 has a circulation structure in which it is connected to a drainage line from the heating space 130 to again perform heat exchange.

Meanwhile, the system 100 for controlling exhaust heat recovery temperature according to the exemplary embodiment of the present invention is configured to include an automatic supplement valve 153, an expansion tank 152, an exhaust heat pump 154, and a mixing valve 151.

The automatic supplement valve 153 is a valve of automatically supplementing direct water and is supplied with the direct water from the outside and supplies the direct water to the expansion tank 152.

The expansion tank 152 is a tank which is connected to the automatic supplement valve 153 to control an expansion pressure in response to the temperature change of the direct water and the exhaust heat pump 154 is a pump which is connected to the expansion tank 152 to circuit heat in the exhaust heat line (closed circuit).

The mixing valve 151 is extendedly formed between a first hot water (1H) line receiving the exhaust heat of the exhaust heat source 10 and a second hot water (2H) line having passed through the exhaust heat exchanger 111 of the hot water tank 110 to mix the first hot water (1H) with the second hot water (2H).

Accordingly, according to the exemplary embodiment of the present invention, the opening of the mixing valve 151 is adjusted depending on the heat exchange temperature of the exhaust heat exchanger 111 to bypass the hot water.

For example, the opening of the mixing valve 151 is adjusted depending on the exhaust heat supply temperature and the exhaust heat recovery temperature or the opening of the mixing valve 151 is adjusted depending on the exhaust heat supply temperature and the exhaust heat recovery temperature changed in response to the introduction of direct water due to the hot water.

Further, according to the exemplary embodiment of the present invention, the system 100 for controlling exhaust heat recovery temperature may be configured to include an exhaust heat supply temperature sensor T1 and an exhaust heat recovery temperature sensor T2.

Here, the exhaust heat supply temperature sensor T1 is a sensor for measuring the temperature of the first hot water (1H) to measure the exhaust heat supply temperature and the exhaust heat supply temperature sensor T2 is a sensor for measuring the temperature of the second hot water (2H) to measure the exhaust heat recovery temperature.

Therefore, the system 100 for controlling exhaust heat recovery temperature may control the opening of the mixing valve 151 to correspond to a temperature difference by re-measuring the exhaust heat supply temperature and the exhaust heat recovery temperature which are lowered upon the introduction of direct water.

Hereinafter, a method for controlling exhaust heat recovery temperature using a mixing valve according to an exemplary embodiment of the present invention will be described in detail.

First, the exhaust heat supply temperature and the exhaust heat recovery temperature are measured. Further, the opening of the mixing valve is adjusted depending on the measured temperature.

Meanwhile, after the introducing of direct water due to the hot water, the exhaust heat supply temperature and the exhaust heat recovery temperature are measured to correspond to the temperature change depending on the direct water and the opening of the mixing valve is adjusted again.

Further, the temperature of the hot water is indirectly measured by measuring the exhaust heat supply temperature and the exhaust heat recovery temperature.

Further, the opening of the mixing valve may be additionally adjusted by calculating average information of the temperatures measured by the temperature sensors of the temperature tank.

The exemplary embodiments of the system for controlling exhaust heat recovery temperature using a mixing valve as described above are only the example. Therefore, it will be appreciated by those skilled in the art that various modifications and equivalent other embodiments are possible from the present invention.

Therefore, it may be appreciated that the present invention is not limited to the forms mentioned in the above detailed description. Accordingly, the actual technical protection scope of the present invention must be determined by the spirit of the appended claims. Further, it is to be construed that the present invention includes all the changes, equivalents, and substitutions which are defined in the appending claims.

[Detailed Description of Main Elements]

| | |
|---|---|
| 10: Exhaust heat source | 100: System for controlling exhaust heat recovery temperature |
| 110: Hot water tank | 111: Exhaust heat exchanger |
| 112: Heating heat exchanger | 120: Auxiliary boiler |
| 130: Heating space | 140: Hot water supply space |

-continued

[Detailed Description of Main Elements]

| | |
|---|---|
| 151: Mixing valve | 152: Expansion tank |
| 153: Automatic supplement valve | 154: Exhaust heat pump |

The invention claimed is:

1. A system for controlling exhaust heat recovery temperature using a mixing valve comprising a hot water tank including an exhaust heat exchanger for recovering exhaust heat from an exhaust heat source and a heating heat exchanger for exchanging heat for heating using hot water, and an auxiliary boiler configured to heat the hot water heat exchanged from the exhaust heat exchanger and the heating heat exchanger to satisfy temperature set by a user and supplying the hot water to a heating space and a hot water supply space, the system including;
   an automatic supplement valve automatically supplementing direct water;
   an expansion tank connected to the automatic supplement valve to adjust expansion pressure depending on a temperature change of the direct water;
   an exhaust heat pump connected to the expansion tank for internal circulation in an exhaust heat line connecting the exhaust heat source and the hot water tank; and
   a mixing valve extending between a first hot water line for receiving the exhaust heat of the exhaust heat source and a second hot water line positioned after passing again through the exhaust heat exchanger of the hot water tank, to mix the first hot water with the second hot water,
   wherein the opening of the mixing valve may be adjusted depending on the temperature of the exhaust heat exchanger or depending on the exhaust heat supply temperature and the exhaust heat recovery temperature changed in response to an introduction of direct water due to the hot water supply.

2. The system of claim 1, further comprising:
   an exhaust heat supply temperature sensor measuring the temperature of the first hot water to measure the exhaust heat supply temperature, and an exhaust heat recovery temperature sensor measuring the second hot water temperature to measure the exhaust heat recovery temperature,
   wherein upon introduction of direct water, the exhaust heat supply temperature and the exhaust heat recovery temperature which are lowered are re-measured and the opening of the mixing valve is adjusted according to a temperature difference thereto.

3. A method for controlling exhaust heat recovery temperature using a mixing valve, comprising steps of:
   measuring an exhaust heat supply temperature and an exhaust heat recovery temperature;
   adjusting an opening of a mixing valve depending on the measured temperature;
   introducing direct water due to hot water supply; and
   adjusting again the opening of the mixing valve to correspond to a change in temperature in response to the direct water.

4. The method of claim 3, wherein the step of measuring the exhaust heat supply temperature and the exhaust heat recovery temperature further includes, calculating average information of temperatures measured by a temperature sensor of the hot water tank.

* * * * *